(12) United States Patent
Kapinos et al.

(10) Patent No.: US 11,374,761 B2
(45) Date of Patent: Jun. 28, 2022

(54) SELECTIVE DEVICE CONNECTION

(71) Applicant: Lenovo (Singapore) Pte. Ltd., Singapore (SG)

(72) Inventors: Robert James Kapinos, Durham, NC (US); Scott Wentao Li, Cary, NC (US); Robert James Norton, Jr., Raleigh, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/060,626

(22) Filed: Oct. 1, 2020

(65) Prior Publication Data

US 2022/0109575 A1 Apr. 7, 2022

(51) Int. Cl.
*H04L 9/40* (2022.01)
*H04L 9/32* (2006.01)
*G06F 13/38* (2006.01)
*G06F 13/20* (2006.01)
*H04L 9/08* (2006.01)

(52) U.S. Cl.
CPC ............ *H04L 9/3234* (2013.01); *G06F 13/20* (2013.01); *G06F 13/382* (2013.01); *H04L 9/0825* (2013.01); *H04L 9/3236* (2013.01); *G06F 2213/0042* (2013.01)

(58) Field of Classification Search
CPC ... H04L 9/3234; H04L 9/3236; H04L 9/0825; G06F 13/20; G06F 13/382; G06F 2213/0042
See application file for complete search history.

(56) References Cited

U.S. PATENT DOCUMENTS

| | | | |
|---|---|---|---|
| 8,281,058 B1* | 10/2012 | McCorkendale | G06F 13/102 710/104 |
| 2013/0086659 A1* | 4/2013 | Tsuji | G06F 1/00 726/6 |
| 2016/0179556 A1* | 6/2016 | McGowan | G06F 11/3051 710/104 |
| 2018/0114024 A1* | 4/2018 | Dasari | G06F 21/572 |
| 2019/0042779 A1* | 2/2019 | Agerstam | G06F 21/6218 |
| 2019/0042805 A1* | 2/2019 | Desai | G06F 21/44 |
| 2021/0110066 A1* | 4/2021 | Liu | H04L 9/0897 |
| 2021/0248223 A1* | 8/2021 | Chippakurthy | G06F 21/44 |

* cited by examiner

*Primary Examiner* — Thaddeus J Plecha
(74) *Attorney, Agent, or Firm* — Ference & Associates LLC

(57) ABSTRACT

One embodiment provides a method, including: connecting a USB device to a secure device; provisioning, at the secure device, the USB device, wherein the provisioning comprises encrypting, using a private key, a hash value associated with a device descriptor associated with the USB device into a product field of the device descriptor: introducing the provisioned peripheral device into a client device; determining, using a processor of the client device, that the USB device is an authorized USB device, wherein the determining comprises: decrypting, using a public key that corresponds to the private key, the hash value; producing, by running a hash function on the device descriptor minus the hash value, a new hash value; and identifying that the hash value is equivalent to the new hash value; and enabling the USB device to gain access to a system of the client device. Other aspects are described and claimed.

10 Claims, 5 Drawing Sheets

SELECTIVE DEVICE CONNECTION

BACKGROUND

Individuals frequently connect a variety of different types of peripheral USB devices (e.g., external hard drives, flash drives, various input devices, etc.) to their information handling devices ("devices"), for example laptop and/or personal computers, hybrid convertible devices, and the like. Most Universal Serial Bus ("USB") devices can be easily connected to the user device (e.g., via plugging the USB device into a corresponding USB port of the user device, etc.) and, once connected, the operating system of the user device can automatically identify the required drives for displaying and/or utilizing content and files stored on the drive.

BRIEF SUMMARY

In summary, one aspect provides a method, comprising: provisioning, at an information handling device, a peripheral USB device, wherein the provisioning comprises: downloading a device descriptor from the USB peripheral device; creating, using a hash function, a hash of the device descriptor; encrypting, using a private key, the hash of the device descriptor; and inserting the encrypted hash into a product field of the device descriptor.

Another aspect provides a method, comprising: detecting, at an information handling device, a connection request from a peripheral USB device; analyzing, responsive to the detecting, a device descriptor packet resident on the peripheral USB device, wherein the analyzing comprises: identifying content that is encrypted in the device descriptor packet; decrypting, using a public key corresponding to a private key used to encrypt the content, the content; identifying a hash value in the decrypted content; and producing, by running a hash function on the device descriptor packet minus the hash value, a new hash value; determining whether the hash value and the new hash value are equivalent; and forwarding the connection request to a system of the information handling device responsive to determining that the hash value and the new hash value are equivalent.

A further aspect provides a method, comprising: connecting, in a physically secure location, a peripheral USB device to a secure information handling device; provisioning, at the secure information handling device, the peripheral USB device, wherein the provisioning comprises encrypting, using a private key, a hash value associated with a device descriptor associated with the USB peripheral device into a product field of the device descriptor; introducing the provisioned peripheral device into a client device located outside of the secure location; determining, using a processor of the client device, that the peripheral USB device is an authorized peripheral USB device, wherein the determining comprises: decrypting, using a public key that corresponds to the private key, the hash value; producing, by running a hash function on the device descriptor minus the hash value, a new hash value; and identifying that the hash value is equivalent to the new hash value; and enabling the peripheral USB device to gain access to a system of the client device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
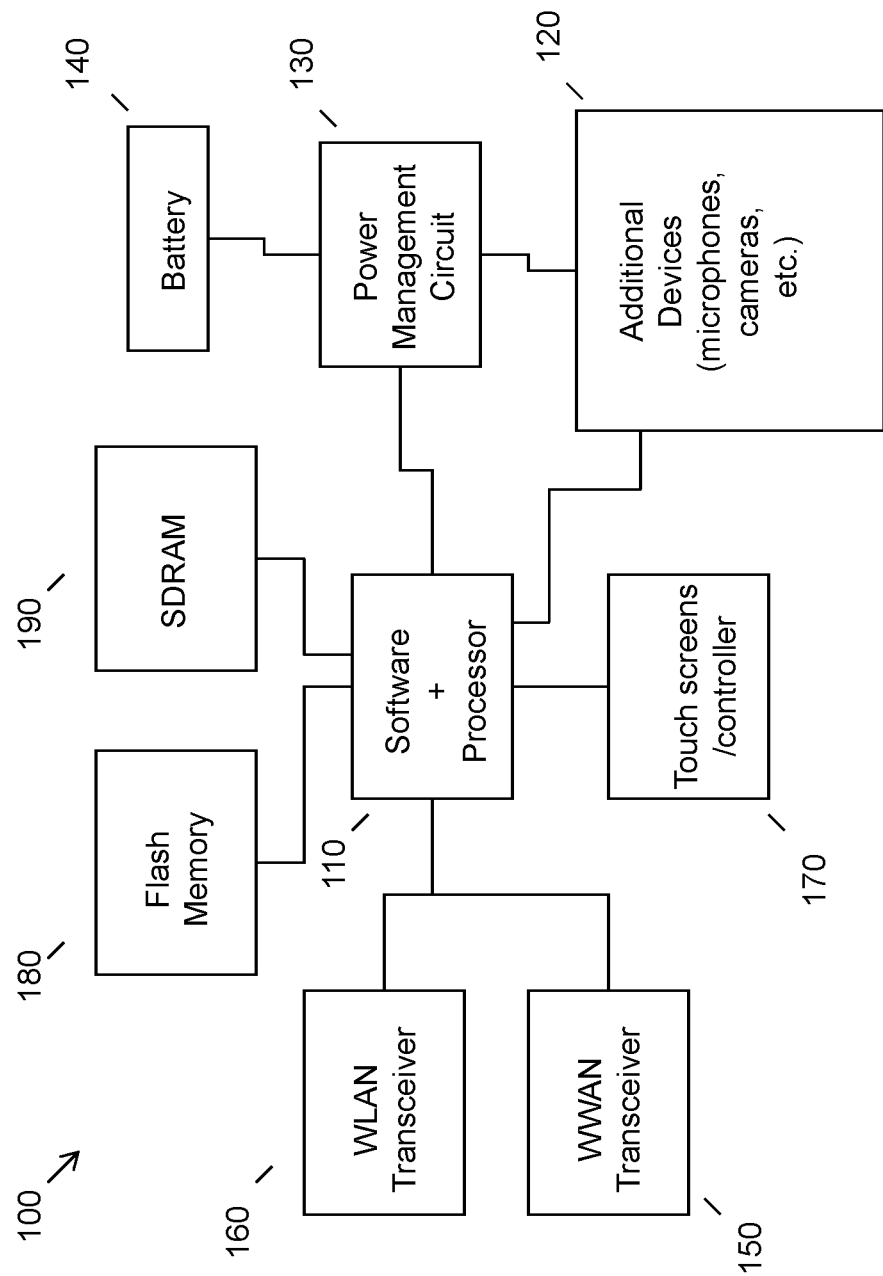
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

It is not unusual for bad actors to use various types of USB devices to obtain unauthorized access to a computer system and/or to harm the system in some way. Traditional attacks involve loading code from a USB storage device (e.g., flash drive, etc.) and then injecting that code into the system. This code may instruct the system to perform some function (e.g., transmit sensitive data to another device, minimize or eliminate device securities, etc.) and/or may cripple the system functionality (e.g., minimize or eliminate device securities, etc.).

There are new classes of security attacks that involve USB device impersonation. With this type of attack, the USB device may impersonate an input/output ("I/O") device (e.g., keyboards, mice, other types of communication peripherals, etc.) in order to send impersonation of user keystrokes/interactions to the system. A key feature of this attack type is that it operates on a very low hardware level. More particularly, this type of attack does not involve any additional software nor does it care about what OS is being run on the target device. Accordingly, it is very difficult to defend against.

An example representation of the impersonation attack described above involves the use of a USB "Rubber Ducky". The USB Rubber Ducky is a USB key that plugs into a USB port and simulates a USB keyboard with a programmable keystroke payload. Variants of the Rubber Ducky emulate other innocent USB devices. A bad actor with an appropriately configured USB Rubber Ducky can intrude into a corporate environment and gain access to any data in a single event. End-users cannot visually distinguish a Rubber Ducky from any ordinary USB device, so intrusion is not even needed in the case where a benign USB device can be physically replaced.

Existing solutions are largely ineffective and burdensome. For instance, one solution involves entirely blocking access to all USB ports on a device. This is extremely inconvenient because many users need various types of peripheral devices (e.g., keyboards, mice, cameras, etc.) to perform basic tasks. Another solution involves the utilization of Product ID and/or Vendor ID whitelisting software. However, such software may be easily spoofed, thereby reducing and/or eliminating its beneficial effect.

Accordingly, a method is provided that allows selective USB peripherals to be attached to a system while simultaneously preventing the foregoing types of impersonation devices to connect. In an embodiment, a peripheral that is brought to an organization may first go through a provisioning process prior to being introduced to the computing environment of the organization. During the provisioning process, a hash value of the device descriptor stored on the peripheral may be created and thereafter encrypted with a private key. When the peripheral is later connected to a client device within the computing environment, this encrypted hash may be detected and decrypted by a public key associated with the private key. An embodiment may again hash the device descriptor packet, at the client device connection, to produce a new hash value. If the new hash value is the equivalent to the original hash value then an embodiment may conclude that the peripheral is an authorized device that can be using with the computing environment of the organization.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
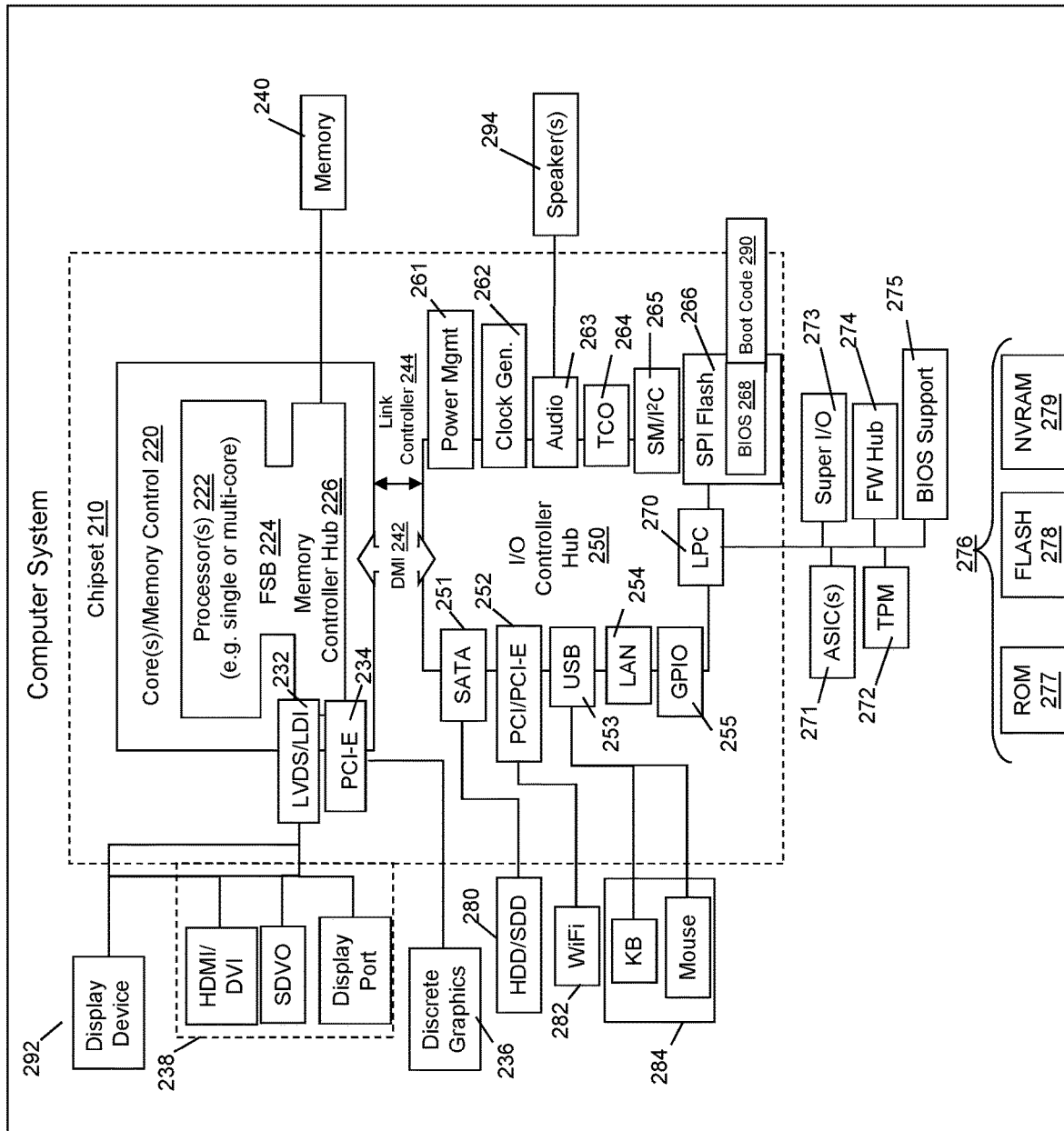
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices capable of accepting a USB device. For example, the circuitry outlined in FIG. 1 may be implemented in a smart phone or tablet embodiment, whereas the circuitry outlined in FIG. 2 may be implemented in a laptop.

Figure 3:
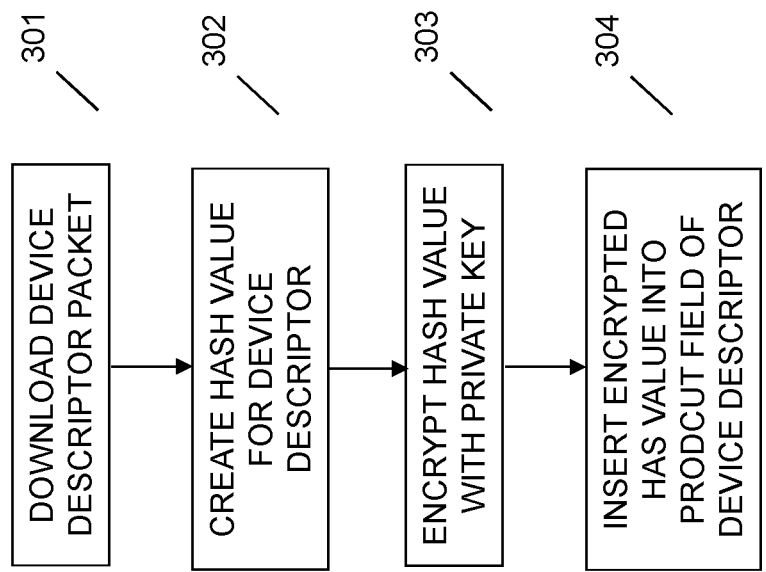
FIG. 3 illustrates an example method of provisioning a peripheral USB device brought to an organization.

Referring now to FIG. 3, a method for only allowing select USB devices to connect to devices in a system is provided. It is important to note that the embodiments described herein are subject to three prerequisites. First, the peripheral USB devices to be used in the corporate environment are firmware written. Second, the corporate software environment can provide and protect a USB bus filter driver inside the system. And lastly, the corporation has its own certificate infrastructure to create public-private certificates.

In an embodiment, the peripheral USB device must first be provisioned prior to introducing it to a computer ecosystem (e.g., a computing environment associated with an organization, etc.). More particularly, each peripheral brought into an organization goes through a short provisioning process that may prime it for operation on computers within the organization. Unprovisioned peripherals will never work within the organization. In an embodiment, the provisioning process may occur on a secure device (e.g., a device with no network connection, etc.) that is located in a physically secure location (e.g., a location that only authorized personnel may enter and that has adequate physical security to prevent code escapes, etc.). Accordingly, prior to use of the peripheral device in the organization computing environment, the peripheral device must first be brought to this secure location to be provisioned (e.g., by an authorized operator, etc.).

At 301, the provisioning process first begins with a downloading of the peripheral device descriptor. More particularly, each peripheral comprises an integrated ROM used for various processes such as device identification, basic functionality probing, and setup. Within the ROM there are various fields that may identify the device, i.e., device descriptors, which can typically be accessed and reprogrammed by a user. Upon introduction of the peripheral to the secure device, the device descriptor may be downloaded and accessed by an operator.

At 302, an embodiment may create a hash value for the device descriptor. More particularly, a system may utilize a specific hash function, or specific hashing algorithm, to map the data in the device descriptor into a fixed length, i.e., the hash value. This hashing process may be conducted by using conventional methods known in the art.

At 303, an embodiment may encrypt the hash of the device descriptor using a private key constructed by and/or available only to the organization. In an embodiment, a single private key may be used for the entire organization or, alternatively, a plurality of private keys may exist, where each private key is associated with some division of/within the organization. Once encrypted with the relevant private key, the hash can later be decrypted using a public key available to and resident on each client device associated with the organization. Such a process may provide an initial indication to the client device that the peripheral has indeed first visited the control area prior to introduction to any client device. At 304, an embodiment may thereafter insert the encrypted hash into a product field of the device descriptor, where it may later be accessed by and analyzed by a client device, as further described herein.

Figure 4:
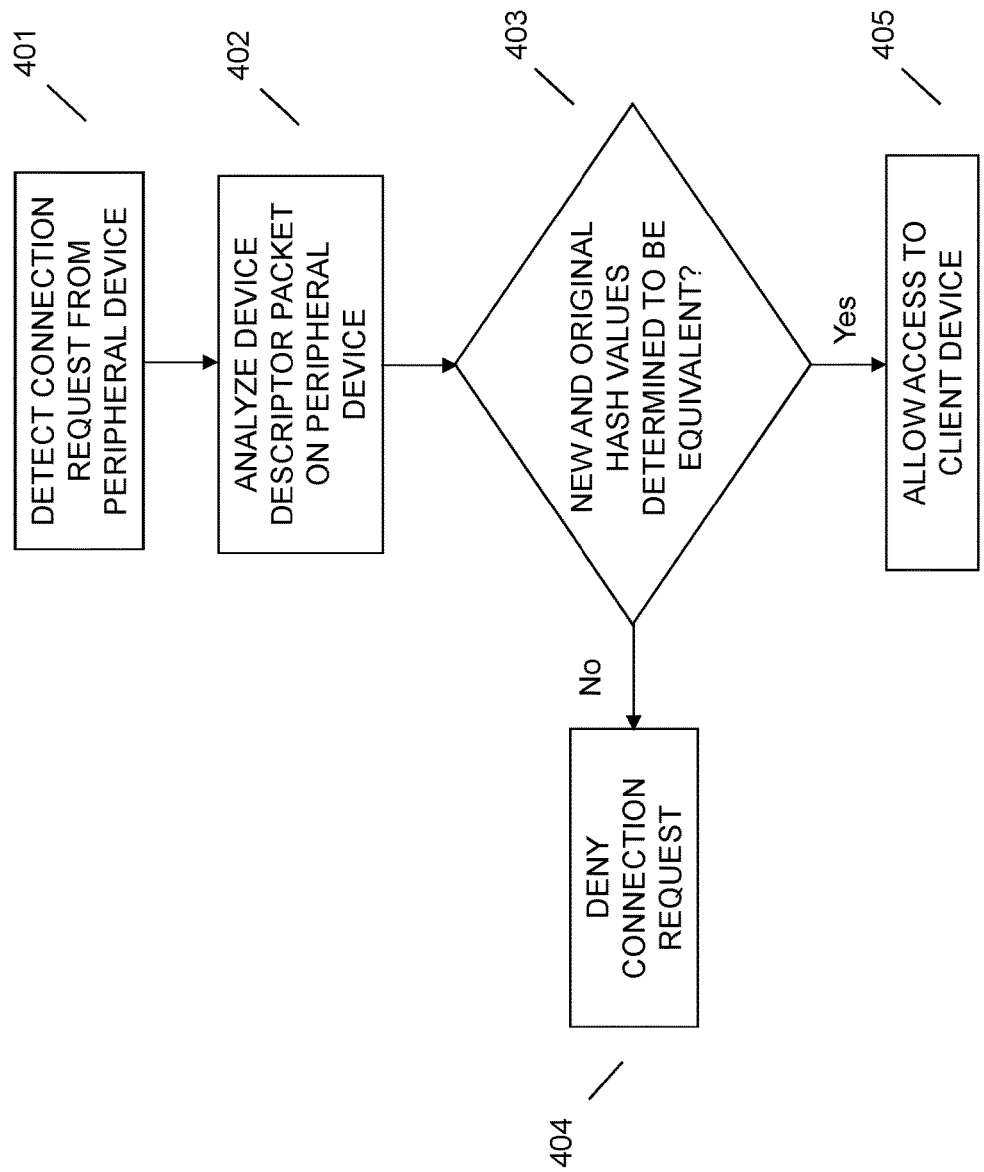
FIG. 4 illustrates an example method of confirming that a provisioned peripheral USB device is an authorized device.

Turning now to FIG. 4, a method for confirming that a peripheral USB device is an approved peripheral USB device is provided. At this stage, the peripheral has been appropriately provisioned, as described above, and has been introduced to the computing environment of an organization. Upon connection of the peripheral to a computer (e.g., via a USB port, etc.), an embodiment may, at 401, detect a connection request from the peripheral.

Upon receipt of the connection request, an embodiment may, at 402, analyze the device descriptor packet resident on the peripheral. This analysis may involve first searching for and/or identifying the encrypted content (i.e., the encrypted hash) in the device descriptor packet. Once found, the encrypted content may be decrypted using a public key that is associated with the private key used to encrypt the content. In an embodiment, for each managed client a USB filter driver ("driver") may be installed at the bus level of the client device. This driver may monitor USB connection requests and snoop the device descriptor packets. Additionally, the driver may be equipped with the public key that corresponds to the provisioning private key, which it may use to decrypt the encrypted hash. An embodiment may then run the same hash function on the device descriptor packet (minus the original hash value) to produce a new hash value. In an embodiment, the analysis procedure may further be facilitated by BIOS firmware resident on the client device and may be initiated responsive to the detection of a particular event (e.g., during initialization of the client device, upon connection of the peripheral to the client device, etc.).

At 403, an embodiment may determine whether the new hash value is equivalent to the original hash value. If the descriptor packet information was not manipulated in any way then the new hash value and the original hash value should be equivalent. Responsive to determining that they are not equivalent, an embodiment may, at 404, deny the connection request of the peripheral. Additionally or alternatively, an embodiment may inform some supervising source (e.g., with an automatically generated push notification or email, etc.) that an unauthorized peripheral has been detected. Conversely, responsive to determining they are equivalent, an embodiment may, at 405, forward the connection request to a system of the client device, which may thereafter allow the client device to access contents stored on the peripheral, and vice versa.

Figure 5:
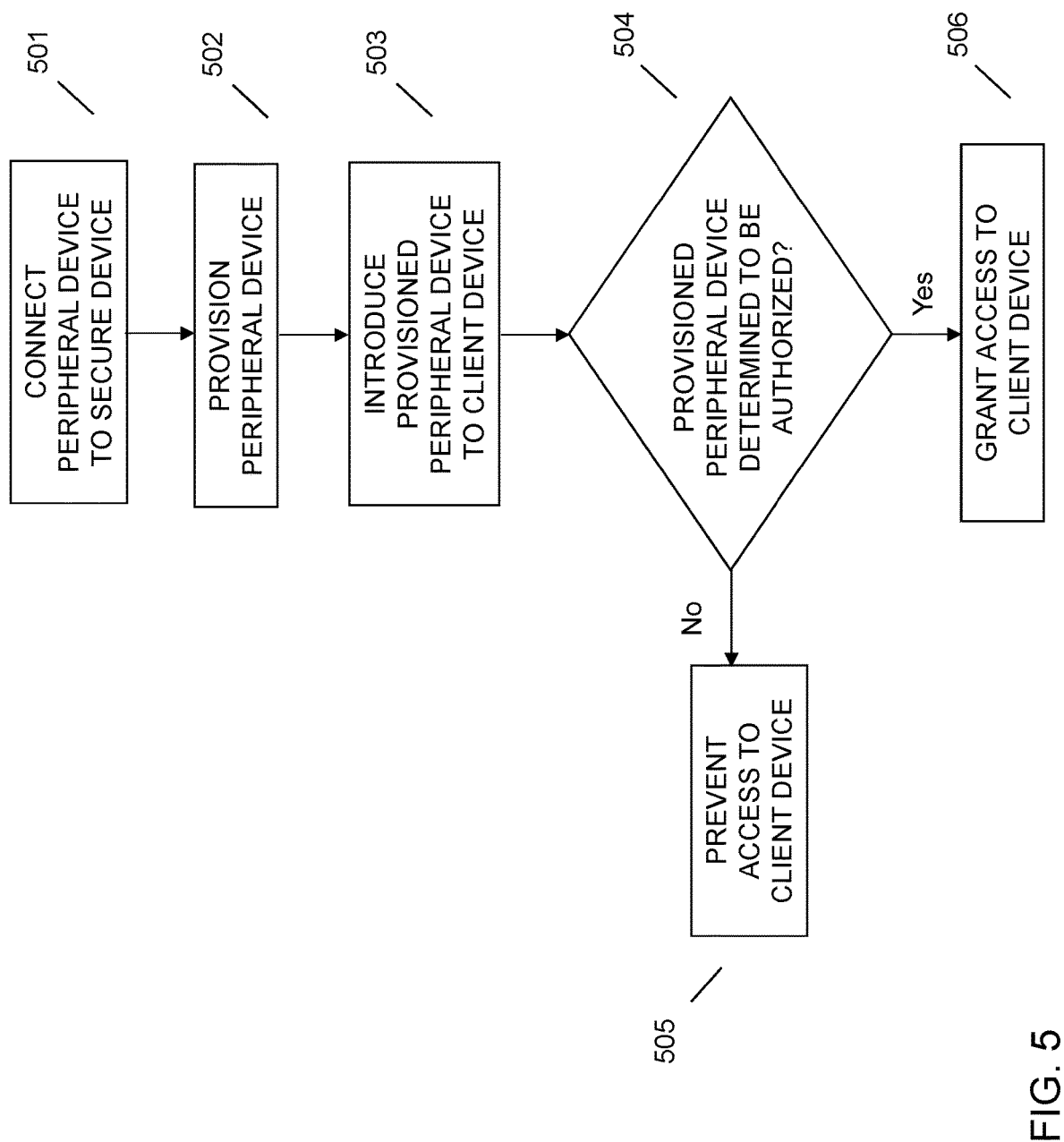
FIG. 5 illustrates an example method of ensuring that only select peripheral USB devices are capable of connecting to client devices in a computing environment of an organization.

Turning now to FIG. 5, taken altogether a method is provided that allows selective USB peripherals to be attached to a system while simultaneously preventing impersonation devices to connect. More particularly, at 501, a peripheral USB device brought to an organization may be first taken to a secure control area and connected to a secure computing device (i.e., a computing device that does not have access to a network). At 502, an embodiment may then provision the peripheral prior to introducing it to an organizational computing environment. In an embodiment, the provisioning process may involve encrypting a hash value associated with a device descriptor of the peripheral into a product field of the device descriptor. The encryption may be conducted by using a private key (e.g., partial to the organization as a whole, partial to a division of the organization, etc.).

At 503, an embodiment may remove the provisioned peripheral device from the secure control area and introduce it to the computing environment of the organization. More particularly, the provisioned peripheral device may be connected to a client device associated with the organization. At 504, an embodiment may determine whether the peripheral device is an authorized peripheral device. Such a determination may involve decrypting the encrypted hash value (e.g., using a public key that is associated with the private key and that is available to the client device, etc.), constructing a new hash value (e.g., by running a hash function on the device descriptor packet, etc.), and thereafter comparing the original and new hash value for equivalency. If the two are not equivalent, an embodiment may, at 505, prevent the peripheral from accessing the client device. If the two are equivalent, an embodiment may conclude that the peripheral is an authorized peripheral and may thereafter, at 506, enable access to a system of the client device. Accordingly, the various embodiments described herein thus represent a technical improvement to conventional methods for allowing peripheral USB devices to connect client devices within an organizational network.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   provisioning, at an information handling device, a peripheral USB device, wherein the provisioning comprises:
   downloading a device descriptor from the USB peripheral device;
   creating, using a hash function, a hash of the device descriptor;
   encrypting, using a private key, the hash of the device descriptor; and
   inserting the encrypted hash into a product field of the device descriptor.

2. The method of claim 1, wherein the information handling device is a secure device.

3. The method of claim 2, wherein the secure device corresponds to a non-network connected device.

4. The method of claim 1, wherein the private key is associated with a corporation.

5. The method of claim 1, wherein the private key is associated with a division of a corporation.

6. A method, comprising:
   detecting, at an information handling device, a connection request from a peripheral USB device, wherein the peripheral USB device is a provisioned peripheral USB device having an encrypted hash value within a device descriptor packet resident on the peripheral USB device generated by a system associated with the information handling device;

analyzing, responsive to the detecting, the device descriptor packet resident on the peripheral USB device, wherein the analyzing comprises:

identifying content that is encrypted in the device descriptor packet;

decrypting, using a public key corresponding to a private key used to encrypt the content, the content;

identifying a decrypted version of the encrypted hash value in the decrypted content; and producing, by running a hash function on the device descriptor packet minus the hash value, a new hash value;

determining the decrypted version of the hash value and the new hash value are equivalent; and forwarding the connection request to a system of the information handling device responsive to determining that the decrypted version of the hash value and the new hash value are equivalent.

7. The method of claim 6, wherein the analyzing comprises analyzing the device descriptor using a USB filter driver.

8. The method of claim 7, wherein the USB filter driver is installed at the bus level of the information handling device.

9. The method of claim 6, wherein the analyzing further comprises analyzing utilizing BIOS firmware resident on the information handling device.

10. A method, comprising:

connecting, in a physically secure location, a peripheral USB device to a secure information handling device;

provisioning, at the secure information handling device, the peripheral USB device, wherein the provisioning comprises encrypting, using a private key, a hash value associated with a device descriptor associated with the USB peripheral device into a product field of the device descriptor;

introducing the provisioned peripheral device into a client device located outside of the secure location;

determining, using a processor of the client device, that the peripheral USB device is an authorized peripheral USB device, wherein the determining comprises:

decrypting, using a public key that corresponds to the private key, the hash value;

producing, by running a hash function on the device descriptor minus the hash value, a new hash value; and identifying that the hash value is equivalent to the new hash value; and enabling the peripheral USB device to gain access to a system of the client device.

* * * * *